(12) United States Patent
Lin et al.

(10) Patent No.: US 8,654,105 B2
(45) Date of Patent: Feb. 18, 2014

(54) OPTICAL TOUCH CONTROL SYSTEMS

(71) Applicant: Quanta Computer Inc., Tao Yuan Shien (TW)

(72) Inventors: Chien-Hung Lin, Tao Yuan Shien (TW); Chen-Kuan Lin, Tao Yuan Shien (TW)

(73) Assignee: Quanta Computer Inc., Kuei Shan Hsiang, Tao Yuan (TW)

( * ) Notice: Subject to any disclaimer, the term of this patent is extended or adjusted under 35 U.S.C. 154(b) by 0 days.

(21) Appl. No.: 14/027,583

(22) Filed: Sep. 16, 2013

(65) Prior Publication Data
US 2014/0015807 A1  Jan. 16, 2014

Related U.S. Application Data

(62) Division of application No. 12/765,036, filed on Apr. 22, 2010, now Pat. No. 8,564,569.

(30) Foreign Application Priority Data

Oct. 22, 2009  (TW) .............................. 98135730 A

(51) Int. Cl.
G06F 3/042  (2006.01)
(52) U.S. Cl.
USPC ............ 345/175; 345/173; 359/630; 359/583
(58) Field of Classification Search
USPC ................................. 345/173–181
See application file for complete search history.

(56) References Cited

U.S. PATENT DOCUMENTS

2008/0013913 A1  1/2008  Lieberman et al.
2009/0141002 A1  6/2009  Sohn et al.

FOREIGN PATENT DOCUMENTS

CN          1797106         7/2006

OTHER PUBLICATIONS

Chinese language office action dated May 2, 2012.

*Primary Examiner* — Alexander Eisen
*Assistant Examiner* — Cory Almeida
(74) *Attorney, Agent, or Firm* — McClure, Qualey & Rodack, LLP

(57) ABSTRACT

An optical touch control system. A monitor includes a first side, a second side, a third side, and a fourth side sequentially connected to each other. A first light guide, a second light guide, and a third light guide are respectively disposed on the first, second, and third sides of the monitor. A first beam splitter is adjacent to the first and second light guides. A second beam splitter is adjacent to the second and third light guides. A first light source and a second light source are respectively adjacent to the first and second beam splitters. A first image sensor is disposed between the first and fourth sides of the monitor. A second image sensor is disposed between the third and fourth sides. The first and second image sensors receive light transmitted onto the monitor via the first, second, and third light guides, identifying touch control operations.

4 Claims, 6 Drawing Sheets

OPTICAL TOUCH CONTROL SYSTEMS

CROSS REFERENCE TO RELATED APPLICATIONS

This Application is a Divisional of application Ser. No. 12/765,036, which is based on, and claims priority from, Taiwan Patent Application No. 098135730, filed on Oct. 22, 2009, the entirety of which is incorporated by reference herein.

BACKGROUND OF THE INVENTION

1. Field of the Invention

The invention relates to optical touch control systems, and more particularly to optical touch control systems with reduced manufacturing costs and enhanced accuracy in touch control.

2. Description of the Related Art

In an optical touch control system, touch control operations are identified by image sensors detecting interception of optical paths.

Referring to FIG. 1, a conventional optical touch control system 1 comprises a monitor 10, a support frame 11, three retro-reflective layers 12, two light sources 13, and two image sensors 14.

The support frame 11 surrounds three sides of the monitor 10 and is an annular construction with an opening.

The retro-reflective layers 12 are attached to inner sides of the support frame 11, respectively.

The light sources 13 are disposed at the opening of the support frame 11 and oppose each other.

The image sensors 14 are also disposed at the opening of the support frame 11 and oppose each other. Here, the image sensors 14 are adjacent to the light sources 13, respectively.

During operation of the optical touch control system 1, incident light output from the light sources 13 are reflected back by the retro-reflective layers 12 along an incident route of the incident light and are received by the image sensors 14. Here, by the image sensors 14 detecting interception of an optical path in any position on the monitor 10, identification of touch control can be obtained.

Nevertheless, because of inherently restricted properties possessed by the retro-reflective layers 12, when the incident angle of the incident light output from the light sources 13 increase, the intensity or energy of the light reflected back along the incident route reduces, such that uniformity of brightness distribution of the light received by the image sensors 14 is poor. Moreover, the retro-reflective layers 12 are unstable in manufacturing. Specifically, the uniformity of the brightness distribution of the light received by the image sensors 14 is affected by micro-structure of the retro-reflective layers 12, a high-frequency sealing treatment applied to the retro-reflective layers 12, uniformity of cladding layers of the retro-reflective layers 12, and flatness of the retro-reflective layers 12 attached to the support frame 11. Accordingly, even though the optical touch control system 1 employs the retro-reflective layers 12 of the same batch, the uniformity of the brightness distribution of the light may often be inconsistent, thereby causing programming calculation errors, and further resulting in abnormal touch control operations.

Referring to FIG. 2, another conventional optical touch control system 2 comprises a monitor 20, three light guides 21, a plurality of light sources 22, and two image sensors 23.

The light guides 21 surround three sides of the monitor 20, forming an opening.

The light sources 22 are respectively disposed on outer sides of the light guides 21 and output light toward the light guides 21 and the top of monitor 20.

The image sensors 23 are respectively disposed at the opening of the light guides 21 and oppose each other.

During operation of the optical touch control system 2, incident light output from the light sources 22 goes to the top of the monitor 20 through the light guides 21 and is received by the image sensors 23. Here, by the image sensors 23 detecting interception of an optical path in any position on the monitor 20, identification of touch control can be obtained.

Nevertheless, as the multiple light sources 22 must be respectively disposed on the outer sides of the light guides 21, manufacturing costs of the optical touch control system 2 are high. Here, even though the number of the light sources 22 is designed to be minimal, i.e. only one light source 22 is disposed on the outer side of each light guide 21, at least three light sources 22 are required by the optical touch control system 2. Moreover, as the multiple light sources 22 are respectively disposed on the outer sides of the light guides 21, the overall size of the optical touch control system 2 cannot be reduced, adversely affecting application of the optical touch control system 2 to a small-size electronic device.

BRIEF SUMMARY OF THE INVENTION

A detailed description is given in the following embodiments with reference to the accompanying drawings.

An exemplary embodiment of the invention provides an optical touch control system comprising a monitor, a first light guide, a second light guide, a third light guide, a first beam splitter, a second beam splitter, a first light source, a second light source, a first image sensor, and a second image sensor. The monitor comprises a first side, a second side, a third side, and a fourth side sequentially connected to each other. The first light guide is disposed on the first side of the monitor. The second light guide is disposed on the second side of the monitor. The third light guide is disposed on the third side of the monitor. The first beam splitter is adjacent to the first and second light guides. The second beam splitter is adjacent to the second and third light guides. The first light source is adjacent to the first beam splitter. Light output from the first light source enters the first and second light guides via the first beam splitter and is transmitted onto the monitor via the first and second light guides. The second light source is adjacent to the second beam splitter. Light output from the second light source enters the second and third light guides via the second beam splitter and is transmitted onto the monitor via the second and third light guides. The first image sensor is disposed between the first and fourth sides of the monitor. The second image sensor is disposed between the third and fourth sides of the monitor. The first and second image sensors receive the light transmitted onto the monitor via the first, second, and third light guides, identifying touch control operations.

The first light source is movably adjacent to the first beam splitter, adjusting proportions of the light respectively entering the first and second light guides.

The second light source is movably adjacent to the second beam splitter, adjusting proportions of the light respectively entering the second and third light guides.

The first light guide comprises a plurality of first micro-reflective portions. The distribution density of the first micro-reflective portions increases progressively in accordance with increase of the distance between the first micro-reflective portions and the first beam splitter.

The second light guide comprises a plurality of second micro-reflective portions. The distribution density of the second micro-reflective portions decreases progressively from the center of the second light guide to the first and second beam splitters.

The third light guide comprises a plurality of third micro-reflective portions. The distribution density of the third micro-reflective portions increases progressively in accordance with increase of the distance between the third micro-reflective portions and the second beam splitter.

Another exemplary embodiment of the invention provides an optical touch control system comprising a monitor, a first light guide, a second light guide, a third light guide, a first beam splitter, a second beam splitter, a first light source, a second light source, a first image sensor, and a second image sensor. The monitor comprises a first side, a second side, a third side, and a fourth side sequentially connected to each other. The first light guide is disposed on the first side of the monitor. The second light guide is disposed on the second side of the monitor. The third light guide is disposed on the third side of the monitor. The first beam splitter is adjacent to the first and second light guides. The second beam splitter is adjacent to the second and third light guides. The first light source is inlaid in the first beam splitter. Light output from the first light source enters the first and second light guides via the first beam splitter and is transmitted onto the monitor via the first and second light guides. The second light source is inlaid in the second beam splitter. Light output from the second light source enters the second and third light guides via the second beam splitter and is transmitted onto the monitor via the second and third light guides. The first image sensor is disposed between the first and fourth sides of the monitor. The second image sensor is disposed between the third and fourth sides of the monitor. The first and second image sensors receive the light transmitted onto the monitor via the first, second, and third light guides, identifying touch control operations.

Yet another exemplary embodiment of the invention provides an optical touch control system comprising a monitor, a first light guide, a second light guide, a third light guide, a first light source, a second light source, a first image sensor, and a second image sensor. The monitor comprises a first side, a second side, a third side, and a fourth side sequentially connected to each other. The first light guide is disposed on the first side of the monitor. The second light guide is disposed on the second side of the monitor and is connected to the first light guide. The third light guide is disposed on the third side of the monitor and is connected to the second light guide. The first light source is adjacent to the first and second light guides. Light output from the first light source enters the first and second light guides and is transmitted onto the monitor via the first and second light guides. The second light source is adjacent to the second and third light guides. Light output from the second light source enters the second and third light guides and is transmitted onto the monitor via the second and third light guides. The first image sensor is disposed between the first and fourth sides of the monitor. The second image sensor is disposed between the third and fourth sides of the monitor. The first and second image sensors receive the light transmitted onto the monitor via the first, second, and third light guides, identifying touch control operations.

The first light source is movably adjacent to the first and second light guides, adjusting proportions of the light respectively entering the first and second light guides.

The second light source is movably adjacent to the second and third light guides, adjusting proportions of the light respectively entering the second and third light guides.

The first light guide comprises a plurality of first micro-reflective portions. The distribution density of the first micro-reflective portions increases progressively in accordance with increase of the distance between the first micro-reflective portions and the first light source.

The second light guide comprises a plurality of second micro-reflective portions. The distribution density of the second micro-reflective portions decreases progressively from the center of the second light guide to the first and second light sources.

The third light guide comprises a plurality of third micro-reflective portions. The distribution density of the third micro-reflective portions increases progressively in accordance with increase of the distance between the third micro-reflective portions and the second light source.

The first, second, and third light guides are integrally formed.

Moreover, in the aforementioned exemplary embodiments, the second light guide is provided with a length A, the first and third light guides are respectively provided with a length B, and the proportions of the light entering the first, second, and third light guides are respectively $2B/(A+2B)$, $A/(A+2B)$, and $2B/(A+2B)$.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

First Embodiment

Figure 1:
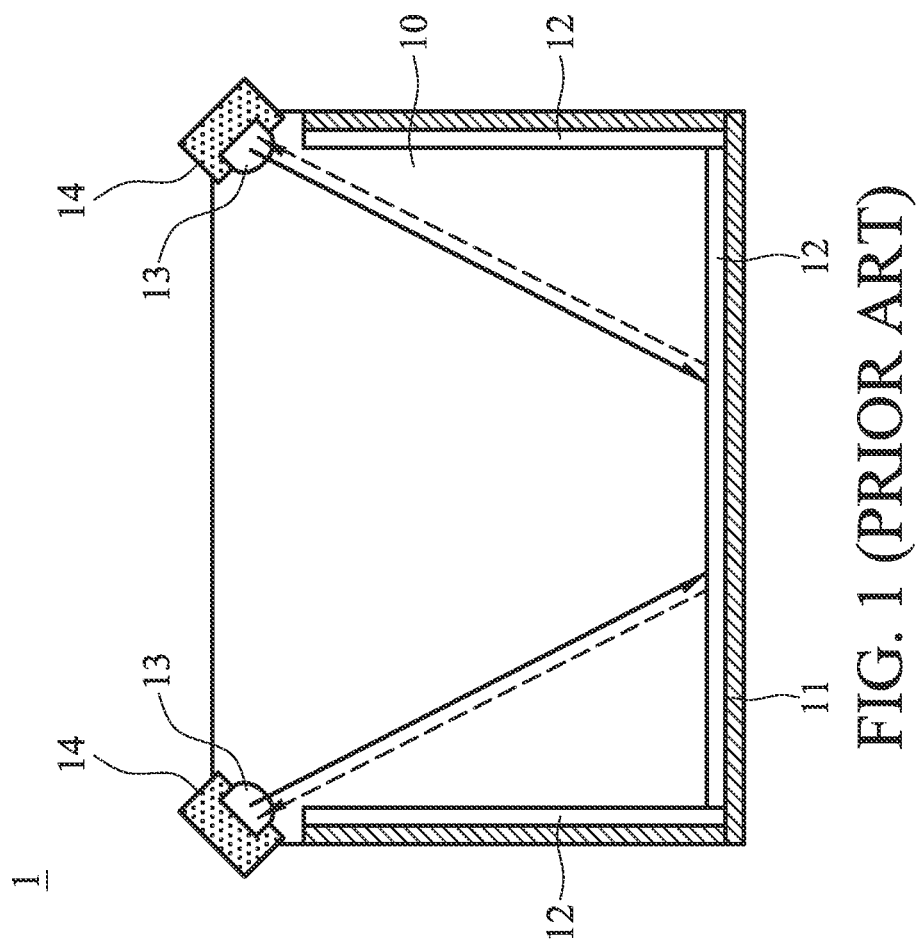
FIG. 1 is a schematic plane view of a conventional optical touch control system.
Figure 2:
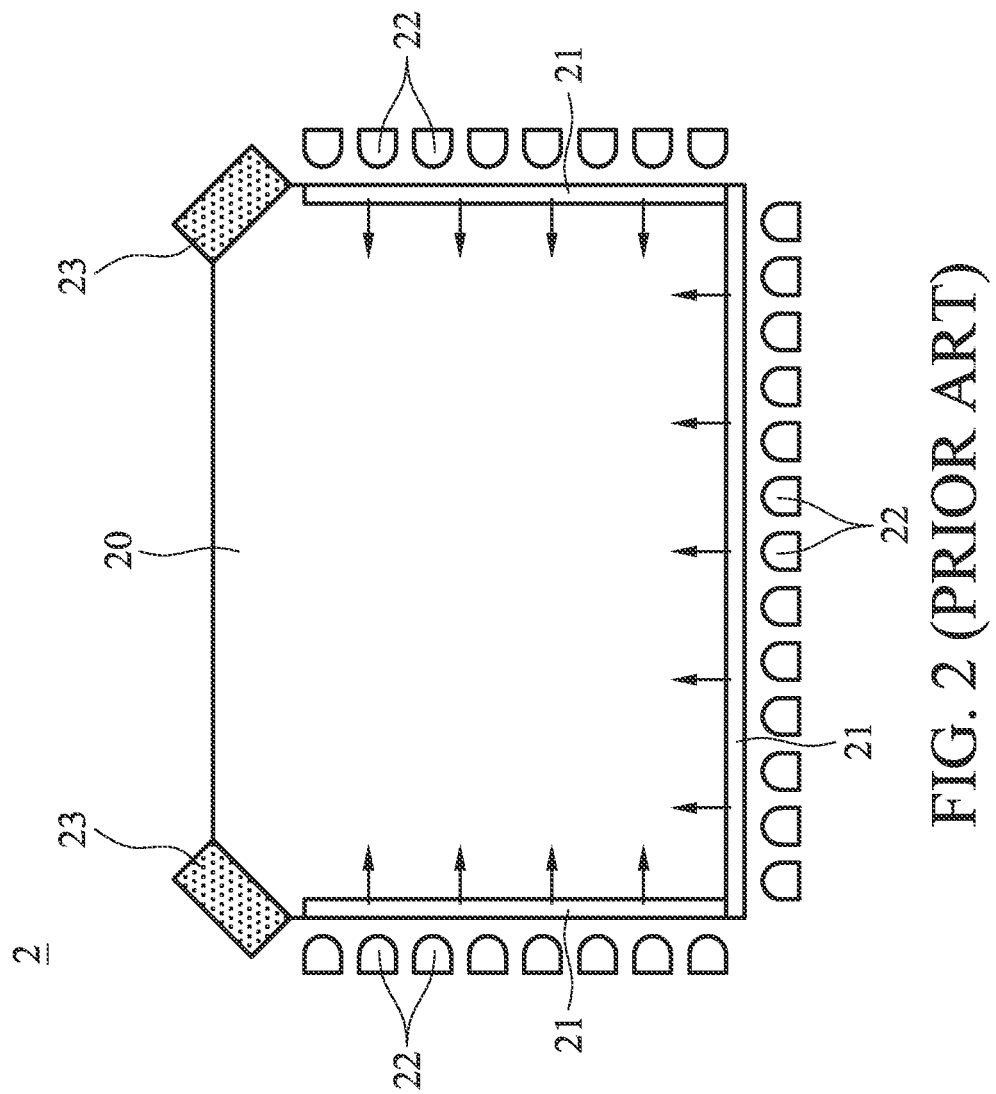
FIG. 2 is a schematic plane view of another conventional optical touch control system.
Figure 3:
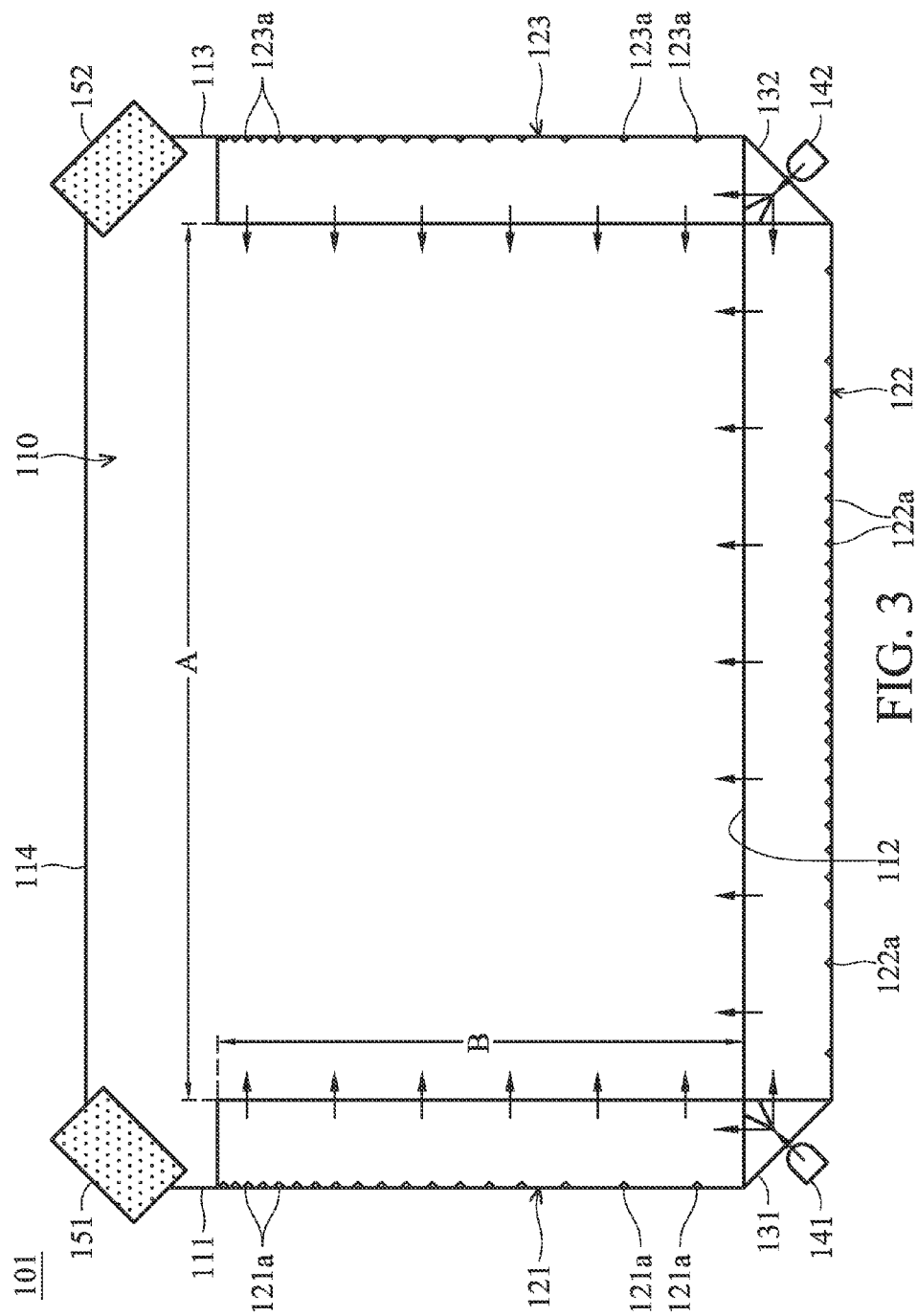
FIG. 3 is a schematic plane view of an optical touch control system of a first embodiment of the invention.

Referring to FIG. 3, an optical touch control system 101 comprises a monitor 110, a first light guide 121, a second light guide 122, a third light guide 123, a first beam splitter 131, a second beam splitter 132, a first light source 141, a second light source 142, a first image sensor 151, and a second image sensor 152.

The monitor 110 comprises a first side 111, a second side 112, a third side 113, and a fourth side 114 sequentially connected to each other.

The first light guide 121 is disposed on the first side 111 of the monitor 110 and comprises a plurality of first micro-reflective portions 121a. Here, the first micro-reflective portions 121a can enhance scattering or diffusion of light in the first light guide 121.

The second light guide 122 is disposed on the second side 112 of the monitor 110 and comprises a plurality of second micro-reflective portions 122a. Here, the second micro-reflective portions 122a can enhance scattering or diffusion of light in the second light guide 122.

The third light guide 123 is disposed on the third side 113 of the monitor 110 and comprises a plurality of third micro-reflective portions 123a. Here, the third micro-reflective portions 123a can enhance scattering or diffusion of light in the third light guide 123.

The first beam splitter 131 is adjacent to the first light guide 121 and second light guide 122.

The second beam splitter 132 is adjacent to the second light guide 122 and third light guide 123.

Specifically, in the first light guide 121, the distribution density of the first micro-reflective portions 121a increases progressively in accordance with increase of the distance between the first micro-reflective portions 121a and the first beam splitter 131. Namely, the larger the distance between the first micro-reflective portions 121a and the first beam splitter 131, the greater the distribution density of the first micro-reflective portions 121a. Additionally, in the second light guide 122, the distribution density of the second micro-reflective portions 122a decreases progressively from the center of the second light guide 122 to the first beam splitter 131 and second beam splitter 132. Namely, the distribution density of the second micro-reflective portions 122a is maximal in the center of the second light guide 122 and is minimal at two ends thereof. Moreover, in the third light guide 123, the distribution density of the third micro-reflective portions 123a increases progressively in accordance with increase of the distance between the third micro-reflective portions 123a and the second beam splitter 132. Namely, the larger the distance between the third micro-reflective portions 123a and the second beam splitter 132, the greater the distribution density of the third micro-reflective portions 123a.

The first light source 141 is adjacent to the first beam splitter 131. Here, light output from the first light source 141 enters the first light guide 121 and second light guide 122 via the first beam splitter 131 and is transmitted onto the monitor 110 via the first light guide 121 and second light guide 122. Specifically, in this embodiment, the first light source 141 is movably adjacent to the first beam splitter 131, adjusting proportions of the light respectively entering the first light guide 121 and second light guide 122.

The second light source 142 is adjacent to the second beam splitter 132. Here, light output from the second light source 142 enters the second light guide 122 and third light guide 123 via the second beam splitter 132 and is transmitted onto the monitor 110 via the second light guide 122 and third light guide 123. Similarly, in this embodiment, the second light source 142 is movably adjacent to the second beam splitter 132, adjusting proportions of the light respectively entering the second light guide 122 and third light guide 123. Moreover, in this embodiment, the first light source 141 and second light source 142 may be IR LEDs.

The first image sensor 151 is disposed between the first side 111 and fourth side 114 of the monitor 110.

The second image sensor 152 is disposed between the third side 113 and fourth side 114 of the monitor 110. Here, the first image sensor 151 and second image sensor 152 receive the light transmitted onto the monitor 110 via the first light guide 121, second light guide 122, and third light guide 123, identifying touch control operations.

Accordingly, to provide the first light guide 121, second light guide 122, and third light guide 123 with the same brightness, the relative positions between the first light source 141 and the first beam splitter 131 and between the second light source 142 and the second beam splitter 132 can be respectively adjusted. For example, as shown in FIG. 3, when the second light guide 122 is provided with a length A and the first light guide 121 and third light guide 123 are respectively provided with a length B, the proportions of the light entering the first light guide 121, second light guide 122, and third light guide 123 are respectively 2B/(A+2B), A/(A+2B), and 2B/(A+2B). The aforementioned proportions are obtained by adjusting the relative positions between the first light source 141 and the first beam splitter 131 and between the second light source 142 and the second beam splitter 132. Additionally, to prevent the brightness distribution of the light in the first light guide 121, second light guide 122, and third light guide 123 from progressively decreasing due to increase of the distance, the distribution density of the first micro-reflective portions 121a increases progressively in accordance with increase of the distance between the first micro-reflective portions 121a and the first beam splitter 131, the distribution density of the second micro-reflective portions 122a decreases progressively from the center of the second light guide 122 to the first beam splitter 131 and second beam splitter 132, and the distribution density of the third micro-reflective portions 123a increases progressively in accordance with increase of the distance between the third micro-reflective portions 123a and the second beam splitter 132.

Accordingly, during operation of the optical touch control system 101, by the first image sensor 151 and second image sensor 152 detecting interception of an optical path in any position on the monitor 110, identification of touch control can be obtained.

Second Embodiment

Elements corresponding to those in the first embodiment share the same reference numerals.

Figure 4:
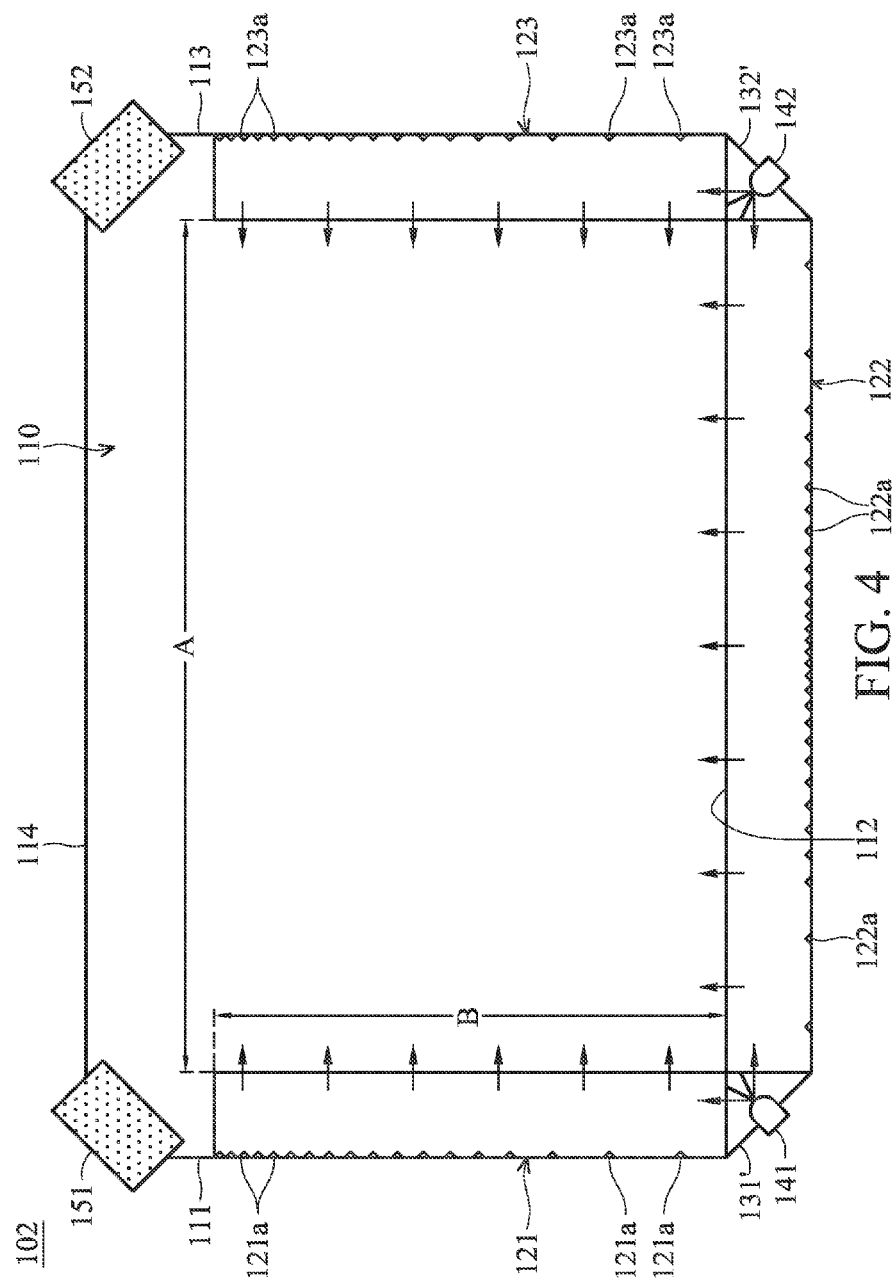
FIG. 4 is a schematic plane view of an optical touch control system of a second embodiment of the invention.

Referring to FIG. 4, an optical touch control system 102 comprises a monitor 110, a first light guide 121, a second light guide 122, a third light guide 123, a first beam splitter 131', a second beam splitter 132', a first light source 141, a second light source 142, a first image sensor 151, and a second image sensor 152.

The first light source 141 is inlaid in the first beam splitter 131'. Here, light output from the first light source 141 enters the first light guide 121 and second light guide 122 via the first beam splitter 131' and is transmitted onto the monitor 110 via the first light guide 121 and second light guide 122.

The second light source 142 is inlaid in the second beam splitter 132'. Here, light output from the second light source 142 enters the second light guide 122 and third light guide 123 via the second beam splitter 132' and is transmitted onto the monitor 110 via the second light guide 122 and third light guide 123.

In this embodiment, to provide the first light guide 121, second light guide 122, and third light guide 123 with the same brightness, the position of the first light source 141 inlaid in the first beam splitter 131' and the position of the second light source 142 inlaid in the second beam splitter 132' can be set optimally. For example, as shown in FIG. 4, when the second light guide 122 is provided with a length A and the first light guide 121 and third light guide 123 are respectively provided with a length B, the proportions of the light entering the first light guide 121, second light guide 122, and third light guide 123 are respectively 2B/(A+2B), A/(A+2B), and 2B/(A+2B). The aforementioned proportions are obtained by setting the position of the first light source 141 inlaid in the first beam splitter 131' and the position of the second light source 142 inlaid in the second beam splitter 132'.

Structure, disposition, and function of other elements in this embodiment are the same as those in the first embodiment, and explanation thereof is omitted for simplicity.

Accordingly, during operation of the optical touch control system 102, by the first image sensor 151 and second image sensor 152 detecting interception of an optical path in any position on the monitor 110, identification of touch control can be obtained.

Third Embodiment

Elements corresponding to those in the first embodiment share the same reference numerals.

Figure 5:
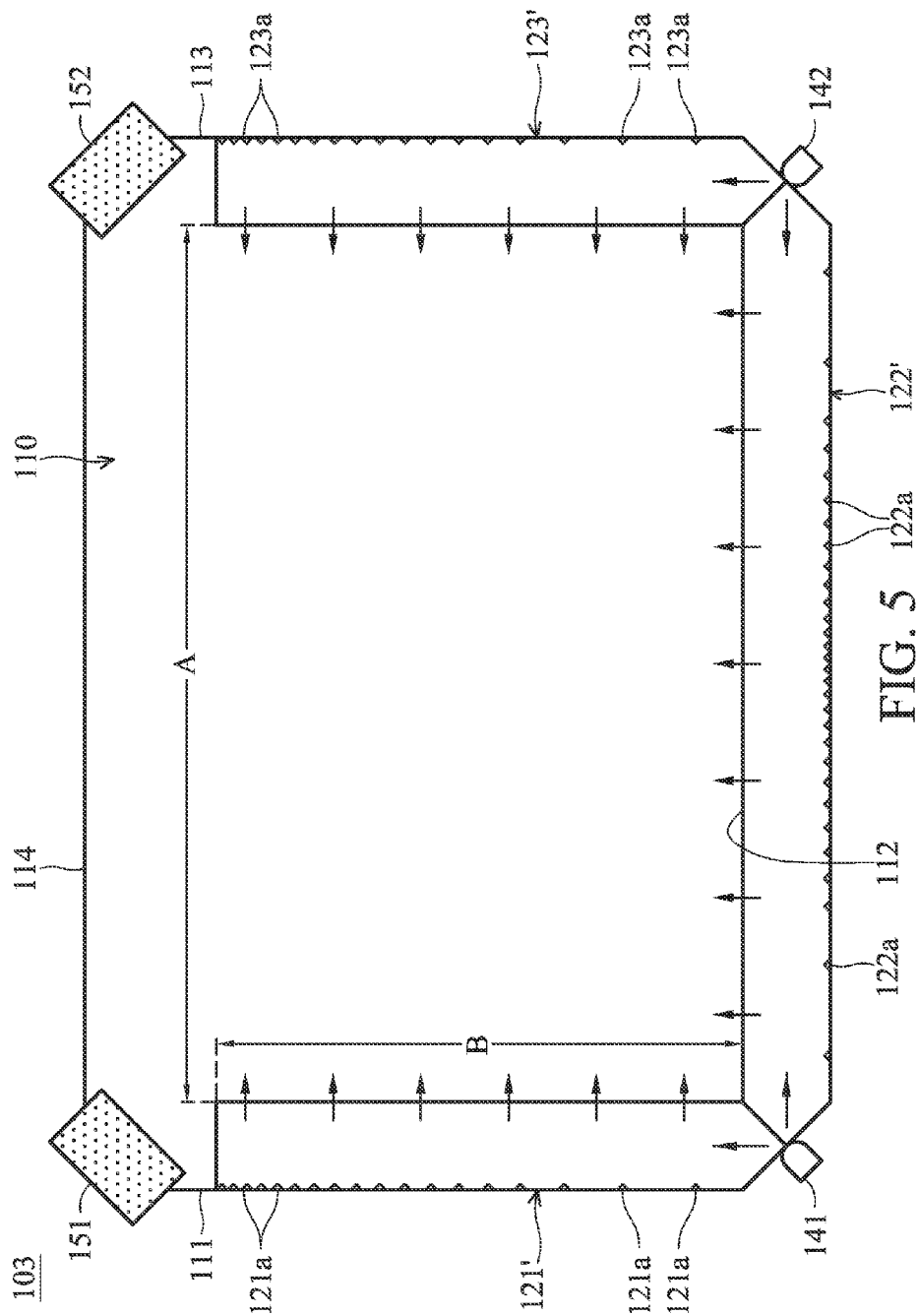
FIG. 5 is a schematic plane view of an optical touch control system of a third embodiment of the invention.

Referring to FIG. 5, an optical touch control system 103 comprises a monitor 110, a first light guide 121', a second light guide 122', a third light guide 123', a first light source 141, a second light source 142, a first image sensor 151, and a second image sensor 152.

The first light guide 121' is disposed on the first side 111 of the monitor 110 and comprises a plurality of first micro-reflective portions 121a. Here, the first micro-reflective portions 121a can enhance scattering or diffusion of light in the first light guide 121'.

The second light guide 122' is disposed on the second side 112 of the monitor 110 and is connected to the first light guide 121'. Here, the second light guide 122' is perpendicular to the first light guide 121'. Similarly, the second light guide 122' comprises a plurality of second micro-reflective portions 122a and the second micro-reflective portions 122a can enhance scattering or diffusion of light in the second light guide 122'.

The third light guide 123' is disposed on the third side 113 of the monitor 110 and is connected to the second light guide 122'. Here, the third light guide 123' is perpendicular to the second light guide 122'. Similarly, the third light guide 123' comprises a plurality of third micro-reflective portions 123a and the third micro-reflective portions 123a can enhance scattering or diffusion of light in the third light guide 123'.

The first light source 141 is adjacent to the first light guide 121' and second light guide 122'. Here, light output from the first light source 141 enters the first light guide 121' and second light guide 122' and is transmitted onto the monitor 110 via the first light guide 121' and second light guide 122'. Specifically, in this embodiment, the first light source 141 is movably adjacent to the first light guide 121' and second light guide 122', adjusting proportions of the light respectively entering the first light guide 121' and second light guide 122'.

The second light source 142 is adjacent to the second light guide 122' and third light guide 123'. Here, light output from the second light source 142 enters the second light guide 122' and third light guide 123' and is transmitted onto the monitor 110 via the second light guide 122' and third light guide 123'. Similarly, in this embodiment, the second light source 142 is movably adjacent to the second light guide 122' and third light guide 123', adjusting proportions of the light respectively entering the second light guide 122' and third light guide 123'. Moreover, in this embodiment, the first light source 141 and second light source 142 may be IR LEDs.

The first image sensor 151 is disposed between the first side 111 and fourth side 114 of the monitor 110.

The second image sensor 152 disposed between the third side 113 and fourth side 114 of the monitor 110. Here, the first image sensor 151 and second image sensor 152 receive the light transmitted onto the monitor 110 via the first light guide 121', second light guide 122', and third light guide 123', identifying touch control operations.

Accordingly, to provide the first light guide 121', second light guide 122', and third light guide 123' with the same brightness, the position of the first light source 141 with respect to the first light guide 121' and second light guide 122' and the position of the second light source 142 with respect to the second light guide 122' and third light guide 123' can be respectively adjusted. For example, as shown in FIG. 5, when the second light guide 122' is provided with a length A and the first light guide 121' and third light guide 123' are respectively provided with a length B, the proportions of the light entering the first light guide 121', second light guide 122', and third light guide 123' are respectively 2B/(A+2B), A/(A+2B), and 2B/(A+2B). The aforementioned proportions are obtained by adjusting the position of the first light source 141 with respect to the first light guide 121' and second light guide 122' and the position of the second light source 142 with respect to the second light guide 122' and third light guide 123'. Additionally, to prevent the brightness distribution of the light in the first light guide 121', second light guide 122', and third light guide 123' from progressively decreasing due to increase of the distance, the distribution density of the first micro-reflective portions 121a increases progressively in accordance with increase of the distance between the first micro-reflective portions 121a and the first light source 141, the distribution density of the second micro-reflective portions 122a decreases progressively from the center of the second light guide 122' to the first light source 141 and second light source 142, and the distribution density of the third micro-reflective portions 123a increases progressively in accordance with increase of the distance between the third micro-reflective portions 123a and the second light source 142.

Structure, disposition, and function of other elements in this embodiment are the same as those in the first embodiment, and explanation thereof is omitted for simplicity.

Accordingly, during operation of the optical touch control system 103, by the first image sensor 151 and second image sensor 152 detecting interception of an optical path in any position on the monitor 110, identification of touch control can be obtained.

Fourth Embodiment

Elements corresponding to those in the first embodiment share the same reference numerals.

Figure 6:
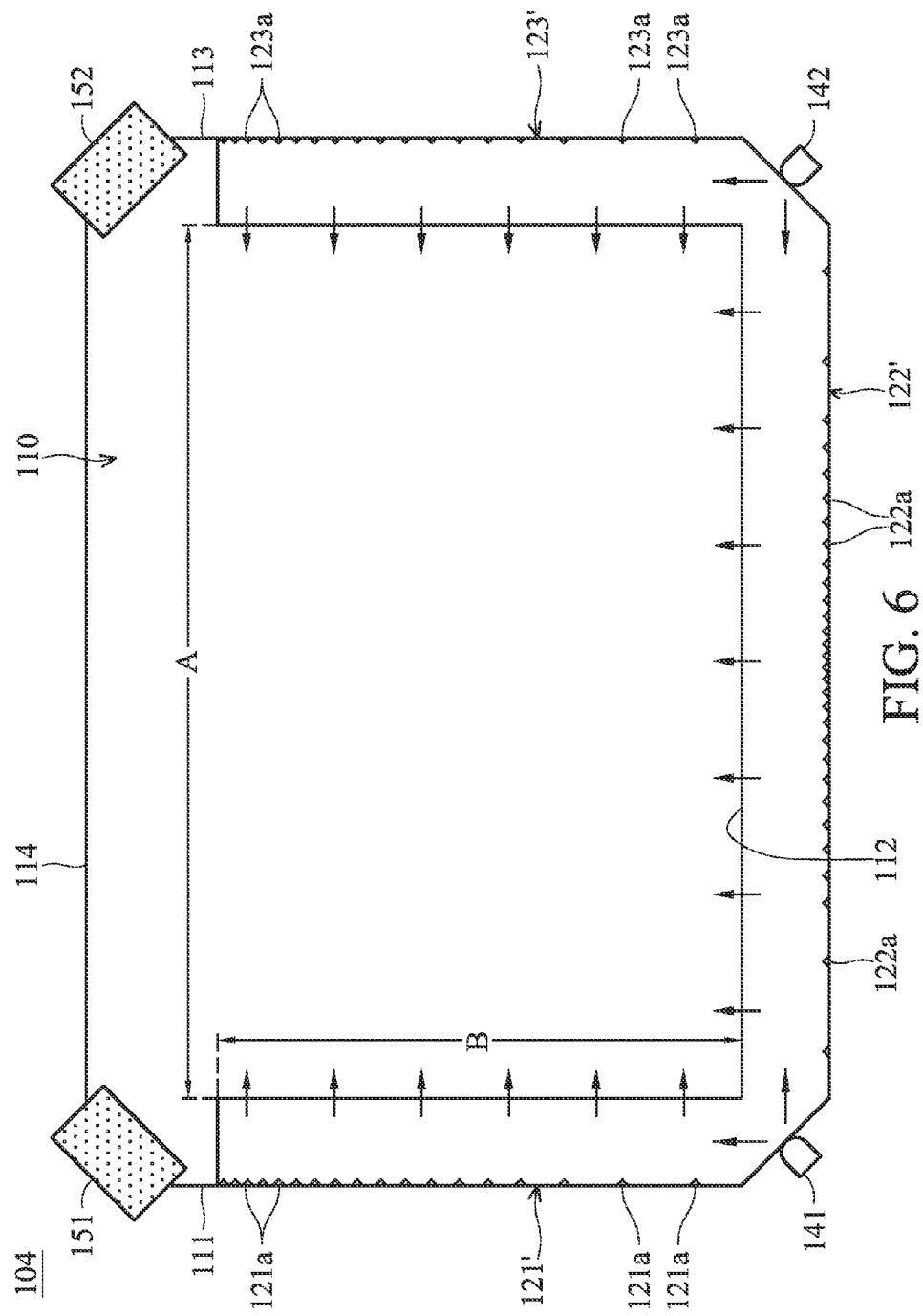
FIG. 6 is a schematic plane view of an optical touch control system of a fourth embodiment of the invention.

Referring to FIG. 6, an optical touch control system 104 comprises a monitor 110, a first light guide 121', a second light guide 122', a third light guide 123', a first light source 141, a second light source 142, a first image sensor 151, and a second image sensor 152.

As shown in FIG. 5 and FIG. 6, the difference between this and third embodiments is that the first light guide 121', second light guide 122', and third light guide 123' of this embodiment are integrally formed.

Similarly, as shown in FIG. 6, when the second light guide 122' is provided with a length A and the first light guide 121' and third light guide 123' are respectively provided with a length B, the proportions of the light entering the first light guide 121', second light guide 122', and third light guide 123' are respectively 2B/(A+2B), A/(A+2B), and 2B/(A+2B). The aforementioned proportions are obtained by adjusting the position of the first light source 141 with respect to the first light guide 121' and second light guide 122' and the position of the second light source 142 with respect to the second light guide 122' and third light guide 123'.

Structure, disposition, and function of other elements in this embodiment are the same as those in the first and third embodiments, and explanation thereof is omitted for simplicity.

Accordingly, during operation of the optical touch control system 104, by the first image sensor 151 and second image sensor 152 detecting interception of an optical path in any position on the monitor 110, identification of touch control can be obtained.

In conclusion, in the disclosed optical touch control systems, because the brightness distribution of the light on the monitors is uniform, the brightness distribution of the light received by the first and second image sensors is uniform as well, thus enhancing accuracy of the touch control operations. Moreover, as only two light sources are required by each disclosed optical touch control system to provide light distribution, overall manufacturing costs thereof are reduced. Additionally, as only two light sources are required by each disclosed optical touch control system, the overall size of each disclosed optical touch control system is effectively reduced, benefiting application thereof to a small-size electronic device.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical touch control system, comprising:
   a monitor comprising a first side, a second side, a third side, and a fourth side sequentially connected to each other;
   a first light guide disposed on the first side of the monitor;
   a second light guide disposed on the second side of the monitor;
   a third light guide disposed on the third side of the monitor;
   a first beam splitter adjacent to the first and second light guides, wherein the first and second light guides are directly connected to different sides of the second beam splitter;
   a second beam splitter adjacent to the second and third light guides, wherein the second and third light guides are directly connected to different sides of the second beam splitter;
   a first light source inlaid in the first beam splitter, wherein light output from the first light source enters the first and second light guides via the first beam splitter and is transmitted onto the monitor via the first and second light guides;
   a second light source inlaid in the second beam splitter, wherein light output from the second light source enters the second and third light guides via the second beam splitter and is transmitted onto the monitor via the second and third light guides;
   a first image sensor disposed between the first and fourth sides of the monitor;
   and
   a second image sensor disposed between the third and fourth sides of the monitor, wherein the first and second image sensors receive the light transmitted onto the monitor via the first, second, and third light guides, identifying touch control operations.

2. The optical touch control system as claimed in claim 1, wherein the first light guide comprises a plurality of first micro-reflective portions, and the distribution density of the first micro-reflective portions increases progressively in accordance with increase of the distance between the first micro-reflective portions and the first beam splitter.

3. The optical touch control system as claimed in claim 1, wherein the second light guide comprises a plurality of second micro-reflective portions, and the distribution density of the second micro-reflective portions decreases progressively from the center of the second light guide to the first and second beam splitters.

4. The optical touch control system as claimed in claim 1, wherein the third light guide comprises a plurality of third micro-reflective portions, and the distribution density of the third micro-reflective portions increases progressively in accordance with increase of the distance between the third micro-reflective portions and the second beam splitter.

* * * * *